United States Patent
Campbell et al.

(10) Patent No.: US 11,798,126 B2
(45) Date of Patent: Oct. 24, 2023

(54) NEURAL NETWORK IDENTIFICATION OF OBJECTS IN 360-DEGREE IMAGES

(71) Applicant: Hewlett-Packard Development Company, L.P., Spring, TX (US)

(72) Inventors: Robert Campbell, Palo Alto, CA (US); Joseph Wang, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 362 days.

(21) Appl. No.: 17/048,130

(22) PCT Filed: Jul. 30, 2018

(86) PCT No.: PCT/US2018/044359
§ 371 (c)(1),
(2) Date: Oct. 16, 2020

(87) PCT Pub. No.: WO2020/027778
PCT Pub. Date: Feb. 6, 2020

(65) Prior Publication Data
US 2021/0357639 A1    Nov. 18, 2021

(51) Int. Cl.
*G06T 3/00* (2006.01)
*G06N 3/08* (2023.01)
(Continued)

(52) U.S. Cl.
CPC ............ *G06T 3/0018* (2013.01); *G06N 3/08* (2013.01); *G06T 3/0043* (2013.01); *G06V 10/82* (2022.01); *G06V 20/52* (2022.01); *G06V 40/172* (2022.01)

(58) Field of Classification Search
None
See application file for complete search history.

(56) References Cited

U.S. PATENT DOCUMENTS

| | | |
|---|---|---|
| 8,036,425 B2 | 10/2011 | Hou |
| 9,706,118 B2 | 7/2017 | Chapdelaine-Couture et al. |

(Continued)

FOREIGN PATENT DOCUMENTS

| | | |
|---|---|---|
| CN | 105700624 | 6/2016 |
| EP | 1677534 | 7/2006 |

(Continued)

OTHER PUBLICATIONS

Ho et al., Dual-Fisheye Lens Stitching for 360-DEGREE Imaging, University of Texas—Arlington, Department of Electrical Engineering, 2017, 5 pages.

*Primary Examiner* — Leon Flores
(74) *Attorney, Agent, or Firm* — QUARLES & BRADY LLP

(57) ABSTRACT

A method, according to one example, includes receiving a 360-degree image that was captured by a 360-degree camera, converting the 360-degree image into a rectangular image, and copying an edge portion from a first edge of the rectangular image and pasting the copied edge portion to a second edge of the rectangular image, thereby forming a modified rectangular image. The method further includes applying a neural network to the modified rectangular image to identify objects appearing in the modified rectangular image, wherein the modified rectangular image facilitates object identification near the second edge.

20 Claims, 4 Drawing Sheets

(51) Int. Cl.
    *G06V 10/82*     (2022.01)
    *G06V 20/52*     (2022.01)
    *G06V 40/16*     (2022.01)

(56) References Cited

U.S. PATENT DOCUMENTS

| | | |
|---|---|---|
| 9,972,066 B1 | 5/2018 | Gilquin |
| 2012/0155786 A1 | 6/2012 | Zargarpour et al. |
| 2014/0139633 A1 | 5/2014 | Wang et al. |
| 2016/0088287 A1 | 3/2016 | Sadi et al. |
| 2016/0180195 A1 | 6/2016 | Martinson et al. |
| 2018/0009746 A1 | 1/2018 | Ikemoto et al. |
| 2018/0060240 A1 | 3/2018 | Kadav et al. |
| 2019/0102868 A1* | 4/2019 | Beric .................... G06T 5/006 |
| 2019/0104253 A1* | 4/2019 | Kawai .................. G06T 3/4038 |

FOREIGN PATENT DOCUMENTS

| | | |
|---|---|---|
| JP | 20070148784 A | 6/2007 |
| WO | WO-2017160539 A1 | 9/2017 |
| WO | WO-2017158236 | 11/2017 |
| WO | 2018/048221 A1 | 3/2018 |
| WO | WO-2018093100 A1 | 5/2018 |

* cited by examiner

NEURAL NETWORK IDENTIFICATION OF OBJECTS IN 360-DEGREE IMAGES

BACKGROUND

Sensing occupancy in a conference room or office space is helpful for monitoring and improving worker experiences. Attendees of formally arranged and ad hoc gatherings want to have a seamless experience at all phases of the meeting (start, middle, ending). Sensors may be deployed in an attempt at automating these phases. Badge readers, Bluetooth Low Energy (BLE) beacons, ultrasonic communications, etc., may be used. These methods involve the meeting attendee either taking an action, or carrying an object or device to conduct a meeting.

DETAILED DESCRIPTION

Figure 1:
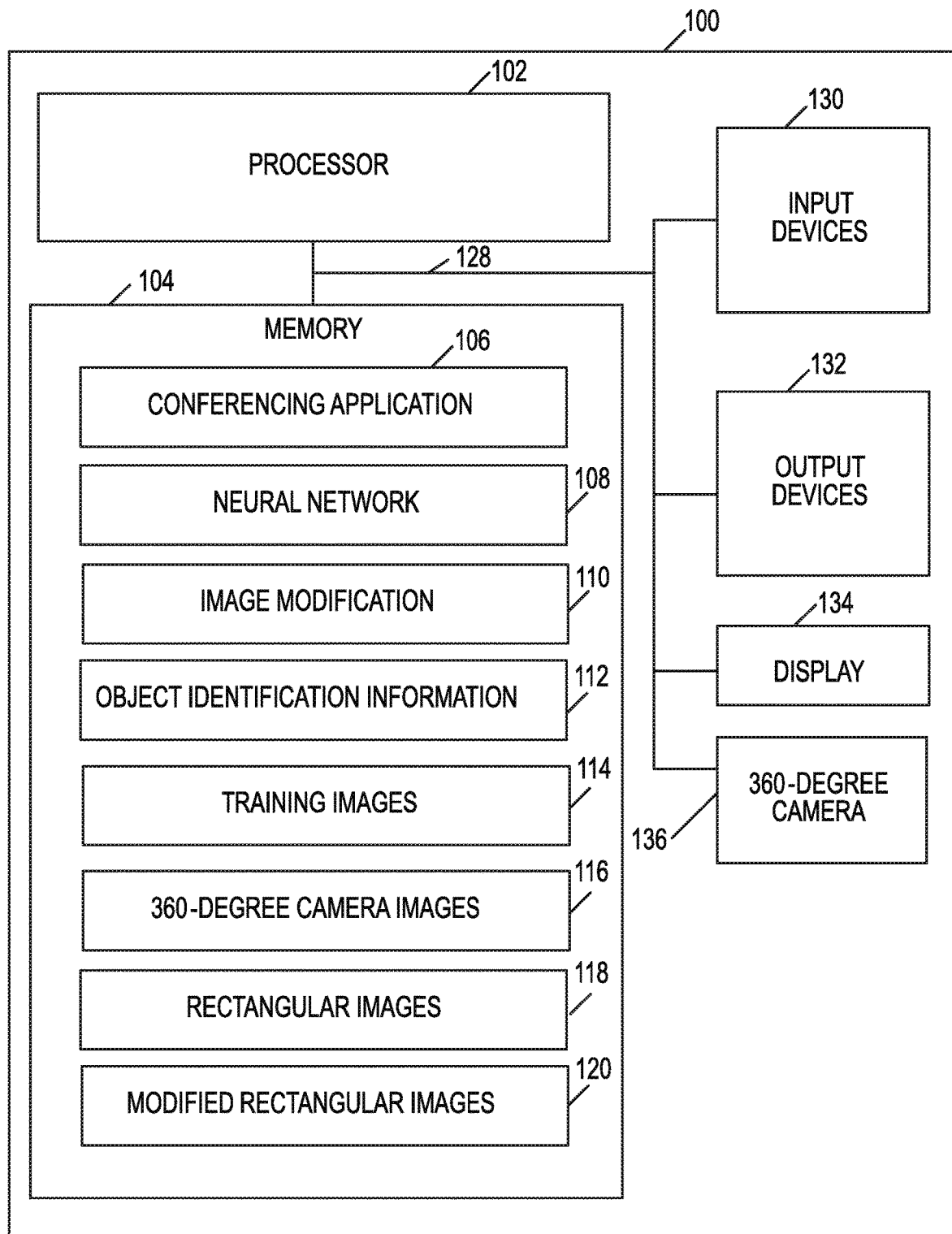
FIG. 1 is a block diagram illustrating a computing system with a 360-degree camera and a neural network for object identification according to one example.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Sensing occupancy in a conference room or office space is helpful to improving worker experiences. Some methods for sensing occupancy involve the meeting attendee either taking an action, or carrying an object or device to conduct a meeting. Some examples disclosed herein use a 360-degree camera combined with neural network object identification to accomplish tracking occupancy, people count, and person identification without the user taking an action or carrying an object or device, such as a personal computer, token, or badge.

Some conferencing solutions may simplify the conferencing experience. A single touch may be used to start the call that is next up on the calendar. With motion sensors on the center of room control, the system can wake when a person approaches the screen. However, such solutions may have security issues. For example, any person who has access to the room may be able to connect to the call without any authentication. Another issue relates to tracking room usage and occupancy. For example, a room may be booked for an in-person meeting, and the conferencing system may not be used for such a meeting, so the system does not track activity. The control screen may also not be facing the person/people in the room to be able to sense their presence. Also, the camera of the conferencing system may not be positioned for optimal room sensing for security and other purposes. Examples disclosed herein address these issues using a 360-degree camera combined with neural network object identification.

Neural networks may be used on images to identify the presence and identity of people, as well as to analyze a speaker and the level of attention of participants. Other parameters may also be analyzed. Neural networks developed for object recognition in images and video generally work well on standard formats (e.g., 4:3 and 16:9 ratios), but may not work as well for 360-degree camera images. Some examples disclosed herein are directed to improving object recognition by neural networks that are applied to 360-degree camera images (still images or video images) for inferencing. The 360-degree views captured by the camera are represented by a rectangular image (e.g., equirectangular image or toroidal image). An object appearing near the edge of the rectangular image may be split, such that a portion of the object appears at the left edge and another portion appears at the right edge. This can prevent the neural network from properly recognizing the object. In one example, an edge portion from a first edge (e.g., left edge) of the rectangular image is copied to a second edge (e.g., right edge) of the rectangular image to form a modified rectangular image. For objects that are split between the left and right edges, these objects appear as complete objects in the modified rectangular image and are properly recognized by the neural network. Standard object recognition neural networks may be used on such modified images without re-training.

FIG. 1 is a block diagram illustrating a computing system 100 with a 360-degree camera 136 and a neural network 108 for object identification according to one example. Computing system 100 includes at least one processor 102, a memory 104, input devices 130, output devices 132, display 134, and 360-degree camera 136. In the illustrated example, processor 102, memory 104, input devices 130, output devices 132, display 134, and 360-degree camera 136 are communicatively coupled to each other through communication link 128.

Input devices 130 include a keyboard, mouse, data ports, and/or other suitable devices for inputting information into system 100. Output devices 132 include speakers, data ports, and/or other suitable devices for outputting information from system 100. Display 134 may be any type of display device that displays information to a user of computing system 100.

360-degree camera 136 generates 360-degree camera images 116, which may be stored in memory 104. In one example, 360-degree camera 136 is a dual fish-eye spherical camera with two image sensors (e.g., positioned back-to-back and each having a field of view sufficient to provide complete 360-degree coverage), and produces 360-degree camera images in a dual fisheye format. In another example, 360-degree camera 136 includes a single image sensor with a mirror, and produces 360-degree camera images in a toroidal format. When used in a conferencing scenario, for example, the 360-degree camera 136 may be positioned near a center of the room to capture images of the complete room.

Processor 102 includes a central processing unit (CPU) or another suitable processor. In one example, memory 104 stores machine readable instructions executed by processor 102 for operating the system 100. Memory 104 includes any suitable combination of volatile and/or non-volatile memory, such as combinations of Random Access Memory (RAM), Read-Only Memory (ROM), flash memory, and/or other suitable memory. These are examples of non-transitory computer readable storage media. The memory 104 is non-transitory in the sense that it does not encompass a transitory signal but instead is made up of at least one memory component to store machine executable instructions for performing techniques described herein.

Memory 104 stores conferencing application module 106, neural network module 108, image modification module 110, object identification information 112, training images 114, 360-degree camera images 116, rectangular images 118, and modified rectangular images 120. Processor 102 executes instructions of modules 106, 108, and 110 to perform techniques described herein. It is noted that some or all of the functionality of modules 106, 108, and 110 may be implemented using cloud computing resources. Any of the images 114, 116, 118, and 120 may also be used in a cloud compute environment. For example, the training images 114 may be used in a cloud compute environment, or other high performance training computer environment, to train the neural network 108.

Conferencing application module 106 allows users to conduct audio and video conferences with remote participants. Neural network module 108 includes at least one neural network that is trained on a set of training images 114, and after being trained, performs object identification functions or other functions using other images, such as images 116, 118, or 120. Neural network module 108 may be used to track occupancy, people count, and person identification, and output object identification information 112 indicative of the tracked information. 360-degree camera images 116 are generated by 360-degree camera 136. Rectangular images 118 may be produced directly by 360-degree camera 136 (e.g., in a toroidal format), or may be produced by image modification module 110 by modifying non-rectangular images produced by 360-degree camera 136 (e.g., images in a dual fisheye format). Modified rectangular images 120 are produced by image modification module 110 by modifying rectangular images, such as by copying an edge portion from a first edge of a rectangular image, and pasting the copied edge portion to a second edge of the rectangular image to form a modified rectangular image.

In some examples, as a person or multiple people enter a conference room or other room containing computing system 100, the computing system 100 will detect that the room is occupied based on images captured by camera 136. This may be used to signal conferencing application 106 or a management system to track usage of the room. The conferencing application 106 may use this action as a wake signal to welcome the occupants, which provides a smooth experience whether a meeting has been scheduled or the people are entering for an ad-hoc meeting.

In addition to detecting occupancy, the computing system 100 can provide a count of people in the room based on images captured by camera 136. This is useful for tracking under or over-utilization of rooms. This information can also recommend to schedulers that a regular meeting should move to a larger or smaller room in the future.

Computing system 100 may also perform identification of a person by name as a form of authentication. Facial recognition may be performed by neural network module 108 based on images captured by camera 136 to determine the identity of people appearing in the images. A person entering the room may not be allowed to start a meeting unless they are determined by the system 100 to be on the participant list. Once the meeting has started, the system 100 can generate a flag if a person not on the list is in the room. Authorized users can be notified for action if they wish, and the system 100 may log these events for further analysis or action.

In one example, the various subcomponents or elements of the system 100 may be embodied in a plurality of different systems, where different modules may be grouped or distributed across the plurality of different systems. To achieve its desired functionality, system 100 may include various hardware components. Among these hardware components may be a number of processing devices, a number of data storage devices, a number of peripheral device adapters, and a number of network adapters. These hardware components may be interconnected through the use of a number of busses and/or network connections. The processing devices may include a hardware architecture to retrieve executable code from the data storage devices and execute the executable code. The executable code may, when executed by the processing devices, cause the processing devices to implement at least some of the functionality disclosed herein. Although some examples disclosed herein relate to audio and video conferencing, other examples may be applied to other scenarios.

Figure 2:
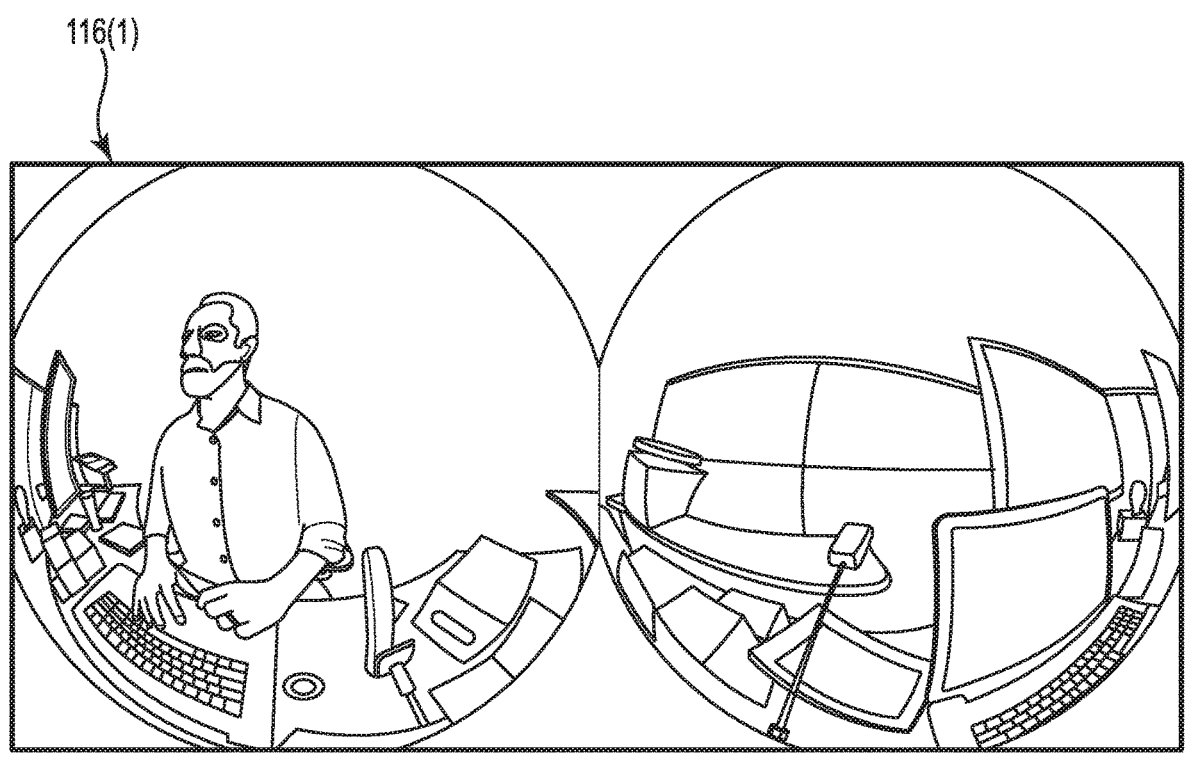
FIG. 2 is a diagram illustrating a simplified representation of a 360-degree camera image in dual fisheye format according to one example.

FIG. 2 is a diagram illustrating a simplified representation of a 360-degree camera image 116(1) in dual fisheye format according to one example. The dual fisheye format is the raw feed of a dual fisheye camera, which is one example of 360-degree camera 136 (FIG. 1), without mapping into a flat equirectangular image.

Figure 3:
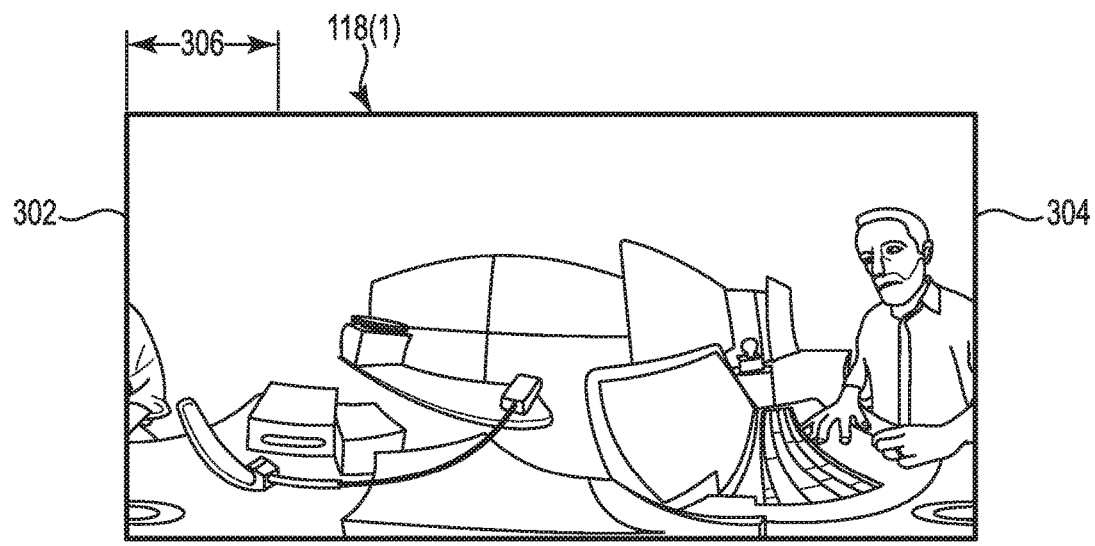
FIG. 3 is a diagram illustrating a simplified representation of a rectangular image in equirectangular format according to one example.

FIG. 3 is a diagram illustrating a simplified representation of a rectangular image 118(1) in equirectangular format according to one example. The equirectangular format is a mapping, performed by image modification module 110, of a 360-degree camera image in dual fisheye format, such as image 116(1) shown in FIG. 2, into a flat image. This mapping is accurate around the "equator", but the distortion at the "poles" may be very distinct. The rectangular image 118(1) includes a left edge 302 and a right edge 304, and a left edge image portion 306. As shown in FIG. 3, a man appearing primarily near the right edge 304 of the image 118(1) is split, such that the majority of the man's upper body appears near the right edge 304 and a smaller portion of the man's upper body (i.e., a portion of his left arm) appears near the left edge 304. This can prevent the neural network module 108 from properly recognizing the man. This issue may be addressed as further described below with reference to FIG. 4.

Figure 4:
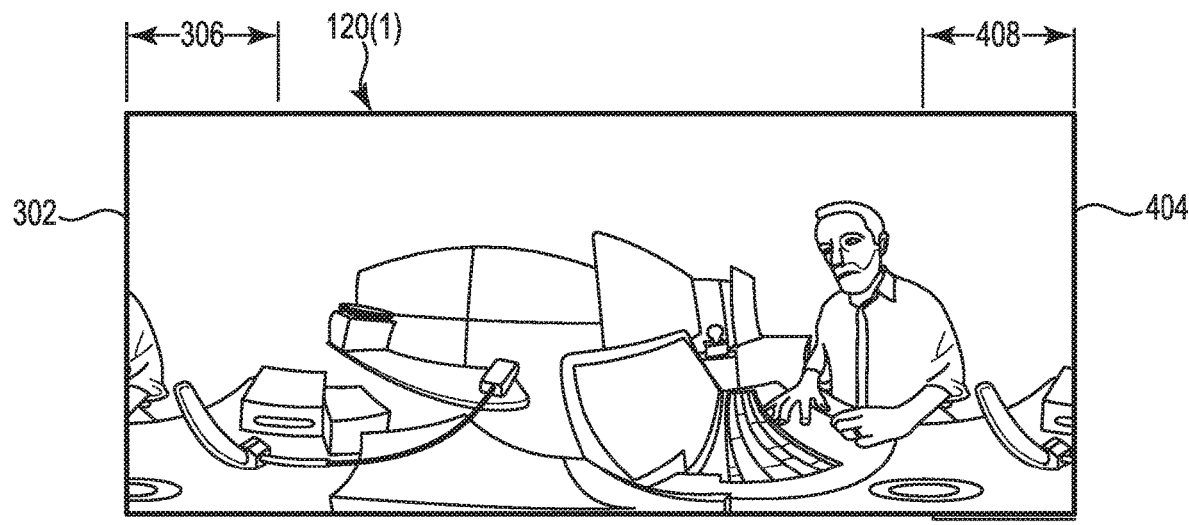
FIG. 4 is a diagram illustrating a simplified representation of a modified rectangular image in equirectangular format with side edge duplication according to one example.

FIG. 4 is a diagram illustrating a simplified representation of a modified rectangular image 120(1) in equirectangular format with side edge duplication according to one example. Modified rectangular image 120(1) is created by image modification module 110 (FIG. 1) by modifying rectangular image 118(1) (FIG. 3). Specifically, image modification module 110 copies the left edge image portion 306 from the left edge 302 of the rectangular image 118(1), and pastes this image portion 306 to the right edge 304 of the rectangular image 118(1) to form the modified rectangular image 120(1) with a new right edge image portion 408 and a new right edge 404. In the modified rectangular image 120(1), the man appearing in the image has his complete upper body shown near the right edge 404, rather than being split between the right and left edges as shown in FIG. 3. This image modification facilitates recognition of the man by the neural network 108.

In some examples, the 360-degree images 116 used by neural network module 108 may be in toroidal format. The toroidal format is a mapping of a single image that compensates for the complex curve of the lens. A toroidal camera, which is another example of 360-degree camera 136, cuts off the highly distorted regions at the "poles" of the image. 360-degree camera images 116 in the toroidal format are rectangular, and may also be referred to herein as rectangular images 118. In some examples, the edge duplication process described above with reference to FIGS. 3 and 4 for copying an image portion from one edge and pasting the image portion to another edge may be performed directly on the 360-degree images in the toroidal format.

In some examples, training images 114 are not 360-degree images, but rather are in a standard format, such as images captured using a 50 mm field of view lens, and having a 4:3 ratio. In these examples, the neural network module 108 is trained on the non-360-degree images, but is later used to perform inferencing on 360-degree images 116. In some examples, the edge duplication process described above with reference to FIGS. 3 and 4 is applied both to the training images 114, as well as the images used by the neural network module 108 for inferencing. In other examples, the edge duplication process is not used, and the training images 114 and the images used by the neural network module 108 for inferencing are both the same type of 360-degree images (e.g., dual fisheye, equirectangular, or toroidal). In other examples, the training images 114 are non-360-degree images that are computationally distorted and converted into synthetic 360-degree images that simulate actual 360-degree images from the raw feed of a 360-degree camera, and these synthetic 360-degree images are used to train the neural network 108 for inferencing on actual 360-degree images.

Figure 5:
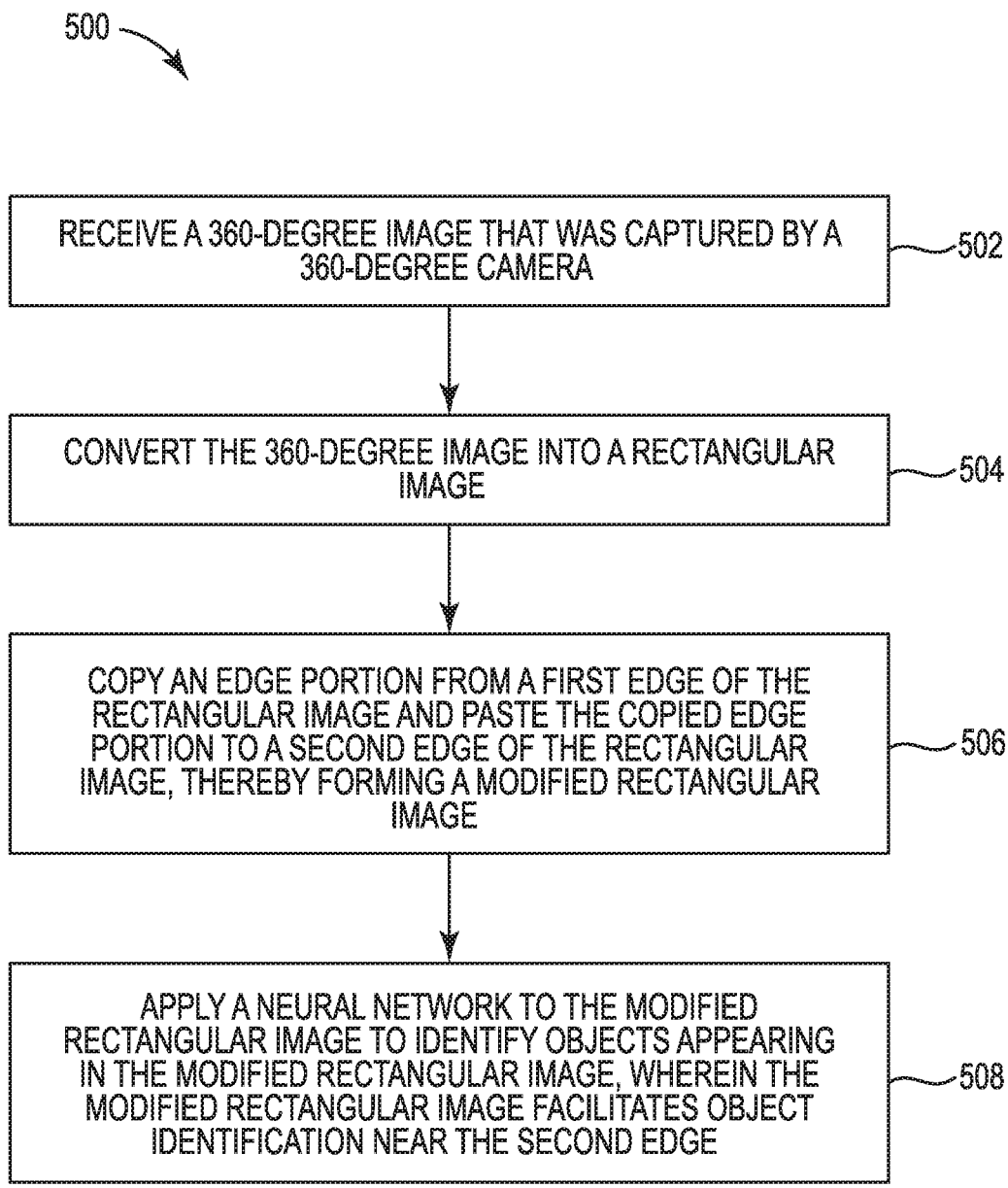
FIG. 5 is a flow diagram illustrating a method for identifying objects appearing in an image according to one example.

One example is directed to a method for identifying objects appearing in an image. FIG. 5 is a flow diagram illustrating a method 500 for identifying objects appearing in an image according to one example. In one example, computing system 100 performs method 500. At 502 in method 500, a 360-degree image that was captured by a 360-degree camera is received. At 504, the 360-degree image is converted into a rectangular image. At 506, an edge portion from a first edge of the rectangular image is copied and pasted to a second edge of the rectangular image, thereby forming a modified rectangular image. At 508, a neural network is applied to the modified rectangular image to identify objects appearing in the modified rectangular image, wherein the modified rectangular image facilitates object identification near the second edge.

The 360-degree image in method 500 may be in a dual fisheye format. The 360-degree image in method 500 may be in a toroidal format. The rectangular image in method 500 may be in an equirectangular format.

The method 500 may further include identifying whether a room is occupied based on an output of the neural network. The method 500 may further include identifying a total number of people in a room based on an output of the neural network. The objects in method 500 may be people, and the method 500 may further include performing a facial recognition function with the neural network to determine identities of the people.

The method 500 may further include providing a plurality of training images; and for each training image, copying an edge portion from a first edge of the training image and pasting the copied edge portion to a second edge of the training image, thereby forming a plurality of modified training images. The method 500 may further include training the neural network on the plurality of modified training images prior to applying the neural network to the modified rectangular image. The method 500 may further include training the neural network on training images that are non-360-degree images. The method 500 may further include training the neural network on training images that are non-360-degree images that are computationally distorted and converted into synthetic 360-degree images that simulate actual 360-degree images.

Another example is directed to a system, which includes a 360-degree camera to generate a 360-degree image. The system includes an image modification module to convert the 360-degree image into a rectangular image, copy an edge portion from a first edge of the rectangular image, and paste the copied edge portion to a second edge of the rectangular image, thereby forming a modified rectangular image that facilitates object identification near the second edge. The system includes a neural network to receive the modified rectangular image as input and identify objects appearing in the modified rectangular image. The 360-degree image may be in one of a dual fisheye format or a toroidal format.

Yet another example is directed to a non-transitory computer-readable storage medium storing instructions that, when executed by a processor, cause the processor to: receive a 360-degree image in a rectangular format; copy an image portion near a first edge of the image; paste the copied image portion near a second edge of the image, thereby forming a modified image; and analyze the modified image with at least one neural network to identify a total number of people appearing in the modified image. The non-transitory computer-readable storage medium may further store instructions that, when executed by a processor, further cause the processor to: analyze the modified image with the at least one neural network to determine identities of the people appearing in the modified image.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A method, comprising:
receiving a 360-degree image that was captured by a 360-degree camera;
converting the 360-degree image into a rectangular image;
copying an edge portion from a first edge of the rectangular image and pasting the copied edge portion to a second edge of the rectangular image, thereby forming a modified rectangular image; and
applying a neural network to the modified rectangular image to identify objects appearing in the modified rectangular image, wherein the modified rectangular image facilitates object identification near the second edge.

2. The method of claim 1, wherein the 360-degree image is in a dual fisheye format.

3. The method of claim 1, wherein the 360-degree image is in a toroidal format.

4. The method of claim 1, wherein the rectangular image is in an equirectangular format.

5. The method of claim 1, and further comprising:
identifying whether a room is occupied based on an output of the neural network.

6. The method of claim 1, and further comprising:
identifying a total number of people in a room based on an output of the neural network.

7. The method of claim 1, wherein the objects are people, and wherein the method further comprises:
performing a facial recognition function with the neural network to determine identities of the people.

8. The method of claim 1, and further comprising:
providing a plurality of training images; and
for each training image of the plurality of training images, copying an edge portion from a first edge of the training image and pasting the copied edge portion to a second edge of the training image, thereby forming a plurality of modified training images.

9. The method of claim 8, and further comprising:
training the neural network on the plurality of modified training images prior to applying the neural network to the modified rectangular image.

10. The method of claim 1, and further comprising:
training the neural network on training images that are non-360-degree images.

11. The method of claim 1, and further comprising:
training the neural network on training images that are non-360-degree images that are computationally distorted and converted into synthetic 360-degree images that simulate actual 360-degree images.

12. A system, comprising:
a 360-degree camera to generate a 360-degree image;
an image modification module to convert the 360-degree image into a rectangular image, copy an edge portion from a first edge of the rectangular image, and paste the copied edge portion to a second edge of the rectangular image, thereby forming a modified rectangular image that facilitates object identification near the second edge; and
a neural network to receive the modified rectangular image as input and identify objects appearing in the modified rectangular image.

13. The system of claim 12, wherein the 360-degree image is in one of a dual fisheye format or a toroidal format.

14. The system of claim 12, wherein the neural network is further to:
output an indication of whether a room is occupied.

15. The system of claim 12, wherein the neural network is further to:
output an indication of a total number of people in a room.

16. The system of claim 12, wherein the objects are people, and wherein the neural network is further to:
perform a facial recognition function to determine identities of the people.

17. A non-transitory computer-readable storage medium storing instructions that, when executed by a processor, cause the processor to:
receive a 360-degree image in a rectangular format;
copy an image portion near a first edge of the image;
paste the copied image portion near a second edge of the image, thereby forming a modified image; and
analyze the modified image with at least one neural network to identify a total number of people appearing in the modified image.

18. The non-transitory computer-readable storage medium of claim 17 storing instructions that, when executed by a processor, further cause the processor to:
analyze the modified image with the at least one neural network to determine identities of the people appearing in the modified image.

19. The non-transitory computer-readable storage medium of claim 17 storing instructions that, when executed by a processor, further cause the processor to:
whether a room is occupied based on an output of the neural network.

20. The non-transitory computer-readable storage medium of claim 17 storing instructions that, when executed by a processor, further cause the processor to:
perform a facial recognition function with the neural network to determine identities of the people appearing in the modified image.

\* \* \* \* \*